(12) United States Patent
Stehlin et al.

(10) Patent No.: US 9,702,342 B2
(45) Date of Patent: Jul. 11, 2017

(54) WIND TURBINE

(71) Applicants: Moog GmbH, Boblingen (DE); Moog Unna GmbH, Unna (DE)

(72) Inventors: Bernhard Stehlin, Leinfelden (DE); Mirko Breitholz, Buxtehude (DE); Tobias Rösmann, Dortmund (DE)

(73) Assignees: Moog Unna GmbH (DE); Moog GmbH (DE)

( * ) Notice: Subject to any disclaimer, the term of this patent is extended or adjusted under 35 U.S.C. 154(b) by 318 days.

(21) Appl. No.: 14/410,027

(22) PCT Filed: Jun. 20, 2013

(86) PCT No.: PCT/EP2013/062866
§ 371 (c)(1),
(2) Date: Dec. 19, 2014

(87) PCT Pub. No.: WO2013/190034
PCT Pub. Date: Dec. 27, 2013

(65) Prior Publication Data
US 2015/0361956 A1  Dec. 17, 2015

(30) Foreign Application Priority Data

Jun. 21, 2012 (EP) ..................................... 12173050
Sep. 10, 2012 (EP) ..................................... 12183672

(51) Int. Cl.
*F03D 9/00* (2016.01)
*H02P 9/04* (2006.01)
(Continued)

(52) U.S. Cl.
CPC ......... *F03D 7/0224* (2013.01); *F03D 1/0666* (2013.01); *F03D 7/042* (2013.01);
(Continued)

(58) Field of Classification Search
USPC ...................................................... 290/44, 55
See application file for complete search history.

(56) References Cited

U.S. PATENT DOCUMENTS 7,449,794 B2 * 11/2008 Guey ......................... F03D 9/25
290/44
8,154,141 B2 * 4/2012 Andresen .............. F03D 7/0224
290/44
(Continued)

FOREIGN PATENT DOCUMENTS

CA  2787441 A1  7/2011
EP  1775465 A2  4/2007
(Continued)

OTHER PUBLICATIONS

The International Search Report (ISR) and Written Opinion of the searching authority for PCT Application Serial No. PCT/EP2013/062866; Publication No. WO 2013/190034; dated Feb. 10, 2015.
(Continued)

*Primary Examiner* — Pedro J Cuevas
(74) *Attorney, Agent, or Firm* — Harter Secrest & Emery LLP

(57) ABSTRACT

The invention relates to a wind turbine (1) with a pitch drive (3) for rotor blade adjustment, whereby the drive regulation (31) of the pitch drive (3) responds to disturbance torques (SM) during operation of the wind turbine (1) so as to have an equalizing effect, and the invention also relates to a corresponding method for the drive regulation (31). For this purpose, the wind turbine (1) comprises at least one load sensor (4) that is arranged in the vicinity of the pitch drive (3) in order to determine the mechanical load being exerted on the drive mechanism (A) due to a disturbance torque (SM), and said load sensor is also provided in order to emit a sensor signal (SS) corresponding to the mechanical load, and the drive regulation (31) comprises a feedback means
(Continued)

(311) for the feedback (R) of an evaluated torque signal (BDS) on the basis of the sensor signal (SS). In this manner, a wind turbine with rotor blade adjustment can be provided that has a prolonged service life, a greater reliability and an improved availability.

18 Claims, 6 Drawing Sheets

(51) Int. Cl.
    *F03D 7/02*     (2006.01)
    *F03D 1/06*     (2006.01)
    *F03D 7/04*     (2006.01)
    *F03D 17/00*     (2016.01)

(52) U.S. Cl.
    CPC ...... *F03D 17/00* (2016.05); *F05B 2270/1095* (2013.01); *Y02E 10/721* (2013.01); *Y02E 10/723* (2013.01)

(56) References Cited

U.S. PATENT DOCUMENTS

| | | | | |
|---|---|---|---|---|
| 8,162,611 | B2 * | 4/2012 | Perkinson | B64C 11/06 416/162 |
| 8,922,040 | B2 * | 12/2014 | Peters | F03D 7/0224 290/44 |
| 2007/0286731 | A1 * | 12/2007 | Dantlgraber | F03D 7/0224 416/162 |
| 2013/0026757 | A1 * | 1/2013 | Peters | F03D 7/0224 290/44 |

FOREIGN PATENT DOCUMENTS

| | | |
|---|---|---|
| EP | 2080902 A2 | 7/2009 |
| EP | 2302208 A1 | 3/2011 |
| EP | 2343455 A1 | 7/2011 |
| GB | 1165008 A | 9/1969 |
| JP | 2003/113769 A | 4/2003 |

OTHER PUBLICATIONS

Translation of the International Search Report (ISR) and Written Opinion of the searching authority for PCT Application Serial No. PCT/EP2013/062866; Publication No. WO 2013/190034; dated Feb. 10, 2015.

The (IB/373) International Preliminary Report on Patentability Chapter I for PCT Application Serial No. PCT/EP2013/062866; Publication No. WO 2013/190034; dated Feb. 10, 2015.

Translation of the (IB/373) International Preliminary Report on Patentability Chapter I for PCT Application Serial No. PCT/EP2013/062866; Publication No. WO 2013/190034; dated Feb. 10, 2015.

"Torque sensor", Mar. 9, 2012 (Mar. 9, 2012), XP055147181, Wikipedia retrieved from the Internet: URL: http://wayback.archive.org/web/20120309073953/http://en.wikipedia.org/wiki/Torque_sensor [retrieved on Apr. 6, 2015].

* cited by examiner

WIND TURBINE

FIELD OF THE INVENTION

The invention relates to a wind turbine with a pitch drive for rotor blade adjustment, whereby the drive regulation of the pitch drive responds to disturbance torques during operation of the wind turbine so as to have an equalizing effect, and the invention also relates to a corresponding method for the drive regulation.

BACKGROUND OF THE INVENTION

Wind turbines use their rotors to convert wind energy into electrical power that is to be fed into a power network. For this purpose, the rotors have at least one rotor blade, whereby most wind turbines have a rotor with three rotor blades. A wind turbine consists essentially of a rotor with a hub and rotor blades as well as with a machine nacelle that accommodates the generator and often a gearbox. The nacelle is mounted rotatably onto a tower whose foundation provides the requisite stability. Depending on the direction of the wind, the nacelle is turned into the wind in such a way that a great deal of wind energy can be converted into electrical power in the generator due to the rotation of the rotor. The wind turbines are started up by control electronics when the wind speeds are greater than a start-up speed and thus hold out promise of producing energy, and the wind turbines are switched off again when the wind speeds are greater than a switch-off speed. In order for the rotor blades to be rotated, they are rotatably mounted in the hub and are rotated into the desired position by means of a pitch drive. The rotation of the rotor blades into or out of the wind is called "pitching". Here, depending on the angle of attack, the rotor blades have a greater or lesser uplift that causes the rotor to rotate. A pitch regulation unit can also stop the rotor in that the rotor blades are rotated into a position that brakes the rotor until it comes to a standstill, even if there is wind. If the rotor is supposed to remain at a standstill, the angle of attack of the rotor blades is selected in such a way that the rotor blades do not receive any uplift from the wind.

Normally, the rotor blades are rotated on the basis of a comparison of a target signal for the desired rotor blade position to an actual signal that corresponds to the current rotor blade position. Due to this differential signal, the drive motor for the rotor blade position is actuated and, via the motor shaft, it exerts a drive torque onto the gearbox in order to change the rotor blade position. External torques of the rotor blade due to the attacking wind forces are superimposed upon said drive torque, resulting in an effective rotational drive torque. Due to turbulences and wind gusts, however, very high torques can act briefly upon the rotor blade drive mechanism. As a result, load peaks can occur during operation of a wind turbine that are far greater than would be derived on the basis of the drive torque of the drive motor used for the rotor blade adjustment, since considerable forces and stresses in the drive mechanism can arise due to the mass inertia of the drive mechanism and due to the friction in the gearbox. The loads of the drive mechanism used for the rotor blade adjustment can even be intensified by mechanical resonances in the components of the wind turbine as well as by play in the individual components. Systems are also known that derive the external torques from a mechanical deformation of the rotor blades. Here, however, for purposes of achieving better control, it is difficult to derive a direct relationship with the loads and vibrations in the rotor blade adjustment mechanism. Therefore, for purposes of improving the service life, the reliability and the availability of the wind turbine, it would be desirable if a rotor blade control were available with which such load peaks or any intensifying resonances could be avoided.

SUMMARY OF THE INVENTION

It is the objective of the present invention to put forward a wind turbine having a rotor blade adjustment means with which the service life, the reliability and the availability of such wind turbine are improved.

This objective is achieved by a wind turbine comprising a rotor with a hub and at least one rotor blade that can rotate around its longitudinal axis and that is mounted in the hub, whereby the angle of attack of each rotor blade relative to the wind can be set by means of a pitch drive—which is connected via a drive shaft to the rotor blade and which comprises a drive regulation unit, a drive motor, a pitch gear and, connected thereto, additional parts of the drive mechanism—by exerting a drive torque on the pitch gear corresponding to the ascertained difference between a target position and an actual position of the rotor blade, whereby at least one load sensor is arranged in the area of the pitch drive in order to determine the mechanical load being exerted on the drive mechanism due to a disturbance torque, and said load sensor is also provided in order to emit a sensor signal corresponding to the mechanical load, and the drive regulation comprises a feedback means for the feedback of an evaluated torque signal on the basis of the sensor signal.

In order to permit adjustment of the rotor blade, the rotor blade is rotatably mounted in the hub. Here, the rotor blade control unit for controlling the rotor blade adjustment comprises the pitch drive and the pitch gear. The pitch drive, in turn, is driven by a drive regulation unit. The area of the pitch drive refers to the vicinity of the pitch drive where the mechanical load of the drive mechanism can be measured by means of the load sensor. Here, the term drive mechanism comprises all components that interact when the rotor blades are being rotated in the hub, including the pitch gear and the pitch drive. The load sensor can be arranged, for example, in the pitch drive, on the pitch drive or near the pitch drive, or else on other parts of the drive mechanism. The load sensor can be any sensor that is capable of detecting a mechanical load having one or more components. The load sensor used here can be, for instance, a torque sensor or a force sensor. Thus, the sensor signal is associated with the mechanical load of one or more parts of the drive mechanism comprising the pitch drive. Owing to the feedback of the sensor signal, the sensor signal is applied to the drive regulation unit in such a way that the loads exerted on the pitch drive stemming from external disturbance torques such as, for instance, wind gusts or turbulences, are at least reduced and so that vibrations in the system are damped. In contrast to prior-art drive and regulation methods, here, in case of external disturbances (which cause the disturbance torques) being exerted on the rotor blade, in spite of the inertia of the drive motor and of the pitch gear, the pitch drive can yield to the load sufficiently quickly, especially to a brief high load, especially if the disturbance torques are greater than the drive torque that the drive motor can generate via its motor shaft. Moreover, the abrupt load peaks that occur due to changes in the direction of the torques when there is mechanical play in the pitch drive (among others, in the drive motor and in the pitch gear) are diminished by the feedback since the drive motor yields to the forces. Thus, in addition, previously weakly damped mechanical transmission elements are sufficiently damped so that any resonances that might occur are damped, thus protecting the components. The avoidance of the impact load that is exerted on the pitch drive and on its drive mechanism prolongs the service life of the individual components. At the same time, this increases the reliability and the availability of such a wind turbine. The load can be measured continuously or periodically by the load sensor, and accordingly, the sensor signal can be transmitted continuously or periodically to the feedback means. In the case of a periodical measurement or transmission, this should be carried out frequently enough for the drive motor to yield in time.

A wind turbine for converting wind energy into electrical power can be installed on land or else as a so-called off-shore system in areas off the coast having moderate water depths. Wind turbines on land typically generate up to 3 MW of electrical power, whereas off-shore systems can supply up to 6 MW of electrical power, since, in comparison to land-based installations, they can be larger and more powerful since there are fewer restrictions pertaining to the height and rotor size, and also because there is more wind. However, more maintenance resources are needed for off-shore systems since they are difficult to access. Precisely for such wind turbines, reliable operation with the best possible availability and service life are important. Wind turbines can have a single rotor blade or several rotor blades, for instance, two, three or four rotor blades. Typically, wind turbines have three rotor blades since this allows the most favorable design for mounting the hub and the rotor.

In this context, a wind turbine has a tower to support the rotatable components. The minimum height of the tower is a function of the rotor diameter, among other things. The term rotor diameter is used here to refer to the diameter of the surface area within which the rotor blades rotate in the wind. Wind turbines can have very different rotor diameters, amounting to more than 120 meters. Due to the local wind flows, turbines on land that have higher towers produce more energy than land-based systems with smaller towers. A nacelle is rotatably mounted on the tower, whereby the axis of rotation of the nacelle (nacelle rotational axis) is generally perpendicular to the ground. The rotor with the hub and the rotor blades is mounted in the nacelle and connected to a generator that serves to generate power. Consequently, the nacelle is also referred to as a machine nacelle. The nacelle can also accommodate a gearbox. Turning the nacelle can place the rotor blades in the most favorable position relative to the wind. Servo motors, for example, follow the direction of the wind, whereby the wind direction is detected by means of so-called wind sensors. The electric connection of the nacelle to the power grid is generally established by means of cables that are permanently connected to the nacelle. The hub refers to the part of the rotor which is arranged rotatably in front of the nacelle at the same height and to which the rotor blades are attached. During wind operation, the axis of rotation of the rotor, and thus also of the hub and of the rotor blades attached to it, is essentially perpendicular to the axis of rotation of the nacelle. One or more rotor blades are mounted in the hub so that the rotor can rotate in order to generate electrical power from the wind energy. Here, the rotor blade is shaped in such a way that the wind that strikes the rotor blade generates an uplift for the rotor blade so that the rotor is made to rotate as a result of the uplift of the rotor blades. Modern rotor blades have a wing-like shape and, as a rule, they are made of fiberglass-reinforced plastic or carbon fibers. The magnitude of the uplift for the rotor blades depends on their angle of attack relative to the wind. The term angle of attack refers here to the angle between the wind direction and the surface of the wing-shaped part of the rotor blades. Depending on the demand for electrical power and on the strength of the wind, different angles of attack might be desirable. This is why the rotor blade is mounted in the hub so that it can rotate around its longitudinal axis. The adjustable angle of attack can also be used to stop (brake) and start (beginning of the rotation) the rotor. At the wind speeds that are suitable for the generation of energy, the rotor, which had been at a standstill, is started up, and if the wind speeds are too high, the wind turbine is switched off and the rotor is stopped in order to protect the system. The wind speed can be measured by means of an anemometer or else it can be derived from the rotational speed of the rotor and from the generated power. An appropriate control unit can then rotate (pitch) the rotor blades in accordance with the measured wind speed. The rotor blades are rotated by means of a so-called pitch drive that is arranged inside the hub. The braking of the turbine can be achieved or assisted, for example, by means of an appropriate angle of attack that brakes the rotation of the rotor blades. If the wind speed is too slow for cost-effective operation of the system or if the rotor is not supposed to rotate during idling operation (or standstill operation) of the wind turbine, then the angle of attack is set to a zero-degree position relative to the wind (feathered mode). The changing of the angle of attack of the rotor blades by the pitch motors in response to the prevailing wind speeds and to the demand for electrical power is also referred to as pitch regulation. Aside from the nacelle, the hub, the rotor and the rotor blade or rotor blades, a wind turbine can also comprise other rotatable components.

In order for the pitch drives to be supplied with the requisite electrical power in case of a network power failure, they are connected to one or more energy storage units that serve as a source of energy. Such energy storage units can be, for example, batteries or supercapacitors. In order to simplify the electric connection to the pitch drives and so as to avoid an electric slip ring for contacting non-rotating components, the pitch drives as well as the energy storage units are mounted on or in the hub or on the rotor, so that the pitch drives as well as the energy storage units rotate along with the hub during the operation of the wind turbine. In contrast to the energy storage units, which do not rotate along, there is no need for an additional slip ring in order to effectuate the electric contacting of the pitch drives.

In one embodiment, the feedback means is configured to influence a drive motor signal on the basis of the evaluated torque signal for the drive motor, which then responds accordingly. Depending on the prevailing conditions, the drive motor can respond by yielding or by exerting a greater torque. For example, information about the intensity of the wind turbulence can be derived from the sensor signal or from the response to the sensor signal or from the evaluated torque signal or from the response to the evaluated torque signal, or else the efficiency or energy losses in the gear can be measured so that, in this manner, especially the state of the gear can be monitored. Suddenly increasing energy losses (due to friction) in the gear can be an indication, for example, of impending gear damage. For instance, the loads that are reported via the sensor signal could be observed for a short period of time and, in order to protect the transmission mechanism, for example, in case of severe turbulence, the wind turbine could be changed into a state in which the loads are reduced.

In one embodiment, the feedback means derives an evaluated torque signal from the sensor signal, taking into account the disturbance torque, and adds this directly or indirectly to the torque of the drive motor. Due to the positive feedback of the sensor signal, an attacking disturbance torque on the rotor blade causes a torque to occur in the same direction on the drive motor. Consequently, the peak load of the components can be reduced. Another advantage is achieved since, due to the fact that the drive motor yields to substantial external loads, the damping of the vibrations present in the pitch drive is improved and thus the alternating load exerted on the components is reduced. In a preferred embodiment, the feedback means evaluates the sensor signal as a function of the frequency and the amplitude. In this manner, it is possible to respond more precisely to peak loads, especially brief loads at a high amplitude.

In one embodiment, the feedback means comprises a separate damping regulator. This likewise achieves that the drive motor yields to the attacking disturbance torques to such an extent that, due to stresses in the mechanical transmission elements, the rotating masses are excited to vibrate to a lesser extent or not at all, or else they decay in a well-damped manner.

In one embodiment, the difference between the target position and the actual position of the rotor blade is determined on the basis of the position of the motor shaft, and a differential signal is fed to a position regulator in the drive regulation unit. Thanks to this regulation measure, it is achieved that the drive motor yields in case of an increasing disturbance torque. Moreover, this avoids additional sensors for determining the rotor blade position are avoided.

In one embodiment, the difference between the target position and the actual position of the rotor blade is determined on the basis of the position of the rotor blade, and a differential signal is fed to a position regulator in the drive regulation unit, the output signal of the position regulator is compared to the evaluated torque signal that has been fed back, and the output signal is then transmitted to a torque regulator that serves to regulate the drive motor. Thanks to this regulation measure as well, it is achieved that the drive motor yields in case of an increasing disturbance torque. Only once the target value for the torque, which is measured as a result of a yielding rotor blade position, has been augmented by a correcting signal from the position regulator does the drive motor respond to the disturbance torques. In this manner, it is achieved that the drive motor and the rotor blade respond virtually synchronously with a prescribed frequency and with the desired damping following external disturbance torques, thus having an alleviating effect on the transmission mechanism of the rotor blade adjustment means.

In one embodiment, the drive regulation unit comprises a comparator that compares the sensor signal to the current of the drive motor. The motor current constitutes a measure of the torque of the drive motor. Consequently, when evaluated with the individual speed profiles of the drive motor, a conclusion can be drawn about the power loss and about the efficiency of the mechanical transmission members by performing an appropriate calculation. The term transmission members refers to all components in the pitch drive and in the pitch gear that are connected to each other.

In one embodiment, the drive regulation unit is connected to additional regulation means of the wind turbine in order to provide the sensor signal to these regulation means. This makes it possible to employ regulation concepts and regulator settings for a superordinated regulation procedure (for example, the start-up of a wind turbine if there is a demand for electrical power in a power network) as well as for the regulation tasks that need to be carried out there, thereby improving these tasks.

In one embodiment, the load sensor has one or more strain gauges, and it is arranged between the drive motor and a base of the pitch drive that is connected to the hub. Due to this arrangement, response torques acting on the pitch drive can be measured. In a preferred embodiment, in this context, the load sensor has a first flange for attachment to the base of the pitch drive and a second flange for attachment to the pitch drive as well as connecting struts between the first and second flanges on which strain gauges are installed. The strain gauges installed on the connecting struts, for example, one strain gauge per connecting strut, measure the shear strain of the two flanges relative to each other. The shear strain changes characteristically with the response torque of the pitch drive being exerted onto the base. Within the scope of the present invention, the person skilled in the art can also use other constructions. In a preferred embodiment, the first flange is attached to the base of the pitch gear while the second flange is attached to the pitch gear. In other embodiments, the second flange can also be attached to other components of the pitch drive.

In an alternative embodiment, the load sensor has one or more strain gauges and it is arranged on the drive shaft. This makes it possible to determine the output torque on the drive shaft. Here, for example, four strain gauges are installed on the drive shaft in the form of a strain gauge full-bridge and they determine the shear strain, which is a measure of the output torque on the drive shaft. In a preferred embodiment, the power supply to the strain gauges and the pick-up of the sensor signal take place contact-free via a rotary transformer transmission. A contact-free supply or transmission from a rotating component (drive shaft) to a stationary component (and vice versa) is advantageous since this takes place without wear and tear. As an alternative, the torques can be detected contact-free by means of an inductive sensor. Such a sensor is based on the anisotropic magnetostrictive effect in ferromagnetic drive shaft surfaces. Depending on the mechanical torsional stress at the measuring point, this effect causes a different magnetic permeability in the direction of the rotational stresses and compressive stresses. The sensor is used to measure this permeability change which, within a large measuring range, is proportional to the torsional stress on the drive shaft surface. As an alternative, this can also be done by means of a slip ring transmitter. Within the scope of the present invention, the person skilled in the art can also use other constructions.

In another alternative embodiment, the load sensor has two rotary encoders, whereby the first rotary encoder is arranged on the drive motor while the second rotary encoder is arranged on the drive shaft, in the pitch drive or on the rotating part of the rotor blade, and the mechanical load is determined from a relative torsional angle between the rotary encoders. When torques are present on the drive, an elastic torsion occurs between the drive motor and the drive shaft that can be measured by means of the two rotary encoders. The difference between the rotational angles of the two rotary encoders corresponds to the torsional angle, and this serves as a measure of the mechanical load of the pitch gear or of the pitch drive. In this case, the sensor signal corresponds to the torsional angle. Within the scope of the present invention, the person skilled in the art can also use other constructions.

In another alternative embodiment, the load sensor has two rotary encoders, whereby the first rotary encoder is arranged on the drive motor while the second rotary encoder is arranged on the drive shaft, in the pitch gear or on the rotating part of the rotor blade, a motor current sensor is provided to determine the current of the drive motor, the measured values of the first rotary encoder, of the second rotary encoder, and of the motor current sensor are fed to a regulating observation means, and subsequently the regulating observation means determines the mechanical load. In this context, the regulating observation means can be configured as a hardware component or as a software component (computer program). The regulating observation means configured as a computer program can be arranged in the feedback means.

The invention also relates to an appertaining method for regulating the drive of a pitch drive in a wind turbine according to the present invention, whereby the pitch drive is connected via a pitch gear to a rotor blade that is rotatably mounted in the hub, comprising the following steps:

- prescribing a target value for the position of the rotor blade,
- comparing the actual value for the position of the rotor blade to the target value in order to form a differential signal,
- emitting a drive motor signal that corresponds to the differential signal so that the drive motor generates a torque on the motor shaft,
- rotating the rotor blade by rotating the motor shaft by certain a rotational angle until the target value for a position of the rotor blade has been reached, and,
- by means of at least one load sensor arranged in the area of a pitch drive, determining the mechanical load being exerted on the drive mechanism due to a disturbance torque that is attacking the rotor blades, and emitting a sensor signal by means of the load sensor during the rotation of the rotor blade, whereby an evaluated torque signal based on the sensor signal is fed back into the drive regulation unit using a feedback means, preferably in order to influence the drive motor signal on the basis of the evaluated torque signal for the drive motor which then yields in response thereto.

By means of the method according to the invention, it is possible to operate a wind turbine with a rotor blade adjustment means so as to attain a prolonged service life, a greater reliability and an improved availability. Here, the motor shaft of the drive motor engages with the pitch drive so that the torques of the motor shaft can be accordingly transmitted via the pitch gear to the drive shaft for the rotor blade.

In one embodiment of the method, the actual value for the position of the rotor blade is determined on the basis of a drive motor position signal or on the basis of a rotor blade position signal, whereby in the case of the rotor blade position signal, the output signal of the position regulator is compared to the evaluated torque signal that has been fed back, and it is then transferred to a torque regulator for purposes of regulating the drive motor. Through this regulation measure, it is achieved that the drive motor yields if the disturbance torque increases. In the latter case, the drive motor only responds to the disturbance torques once the target value for the torque has been augmented by a correcting signal from the position regulator, said value being measured on the basis of a yielding rotor blade position. As a result, it is achieved that the drive motor and the rotor blade respond largely synchronously at a prescribed frequency and desired damping, subsequent to external disturbance torques, and consequently, this relieves the transmission mechanism of the rotor blade adjustment means.

BRIEF DESCRIPTION OF THE FIGURES

These and other aspects of the invention are shown in detail in the figures as follows.

DETAILED DESCRIPTION OF THE EMBODIMENTS

Figure 1:
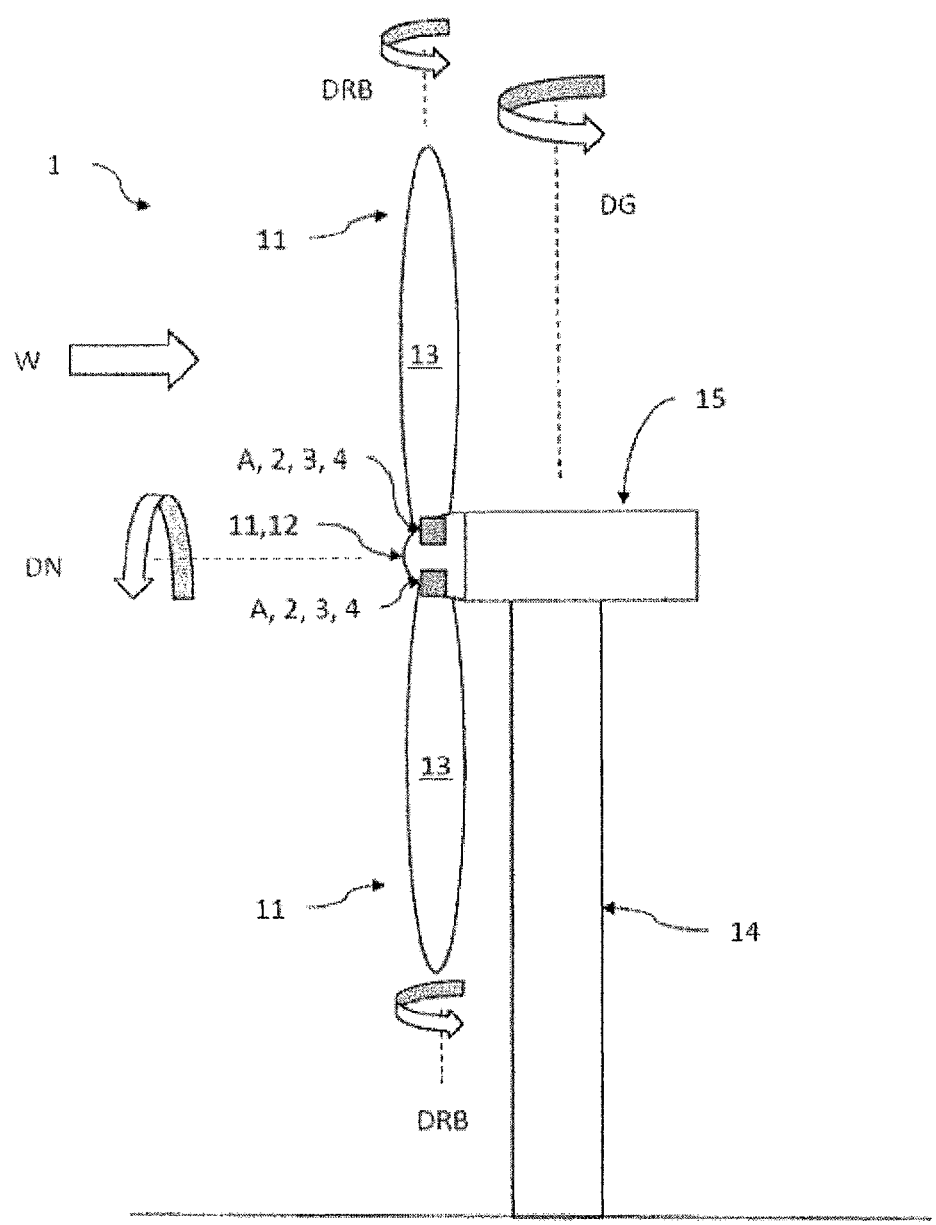
FIG. 1 an embodiment of a wind turbine according to the invention, in an overview, FIG. 2 an embodiment of a drive mechanism according to the invention, with a load sensor in the area of the pitch drive (a) as an overview, and (b) as a detailed view of the load sensor, FIG. 3 an alternative embodiment of a drive mechanism according to the invention, with a load sensor on the drive shaft (a) as an overview, and (b) as a detailed view of the load sensor, FIG. 4 another alternative embodiment of a drive mechanism according to the invention, having a load sensor with rotary encoders, FIG. 5 an embodiment of the drive regulation according to the invention, with feedback of an evaluated torque signal, FIG. 6 an alternative embodiment of the drive regulation according to the invention, with feedback of an evaluated torque signal.

FIG. 1 shows an embodiment of a wind turbine 1 according to the invention in a side overview. Here, the wind turbine 1 with pitch regulation consists of several components comprising a tower 14 that supports the other components of the wind turbine and that is anchored in the ground. On the tower 14, there is a nacelle 15 that is mounted on the tower 14 so as to be rotatable around an axis of rotation DG, a rotor 11 that has a hub 12 and that is attached to the nacelle 15 so as to be rotatable around an axis of rotation DN, and at least two rotor blades 13 mounted in the hub 12. In this side view, the wind turbine 1 can have two rotor blades 13 or three rotor blades 13, whereby in the latter case, the view of the third rotor blade 13 is covered by the hub 12. In the wind W, the rotor blades 13 have an uplift that is dependent on the angle of attack relative to the wind W and that serves to rotate the rotor 11 around the axis of rotation DN, whereby each rotor blade 13 is mounted in the hub 12 so as to be rotatable around is longitudinal axis (axis of rotation DRB), so that the angle of attack of each rotor blade 13 can be adjusted relative to the wind W by means of a pitch drive 3 via a pitch gear 2. The pitch drive 2 can be coupled to the rotor blade 13, for example, via a pinion that engages with a sprocket wheel of the rotor blade 13 and that is connected to the pitch gear 3. During wind operation of the wind turbine 1, the average wind W generates an average uplift for the rotor blades 13. Disturbance torques caused by wind gusts (deviation from the average wind speed and, if applicable, from the average wind direction) and/or turbulences (deviation from the average wind direction and wind speed) that can intensify or diminish the uplift for the rotor blades are superimposed onto this uplift. Via the feedback of the disturbance torque after the measurement by the load sensor 4, the drive regulation unit of the pitch drive 3 brings about a corresponding response of the drive motor (for example, yielding), which brings the rotor blades 13 into a target position or holds them in the target position. This yielding causes a reduction of the harmful effect of these disturbance torques on the components of the drive mechanism, thereby prolonging the service life and thus also the availability of the wind turbine 1 as such. Accordingly, the maintenance required for these components is reduced. Here, each of the rotor blades 13 has a pitch drive 3, a pitch gear 2 and a load sensor 4 in order to feed back a sensor signal into the drive regulation unit (for the sake of clarity, not shown in detail here), whereby the drive mechanism consisting of the pitch gear 2, the pitch drive 3 and the load sensor 4 is arranged in the hub 12 and, in case of a network power failure, it is supplied with electrical power by one or more energy storage units that are likewise arranged in the hub 12. The pitch drives 3 and the energy storage units rotate along with the hub 12 during wind operation. Suitable energy storage units are, for example, batteries or supercapacitors.

Figure 2:
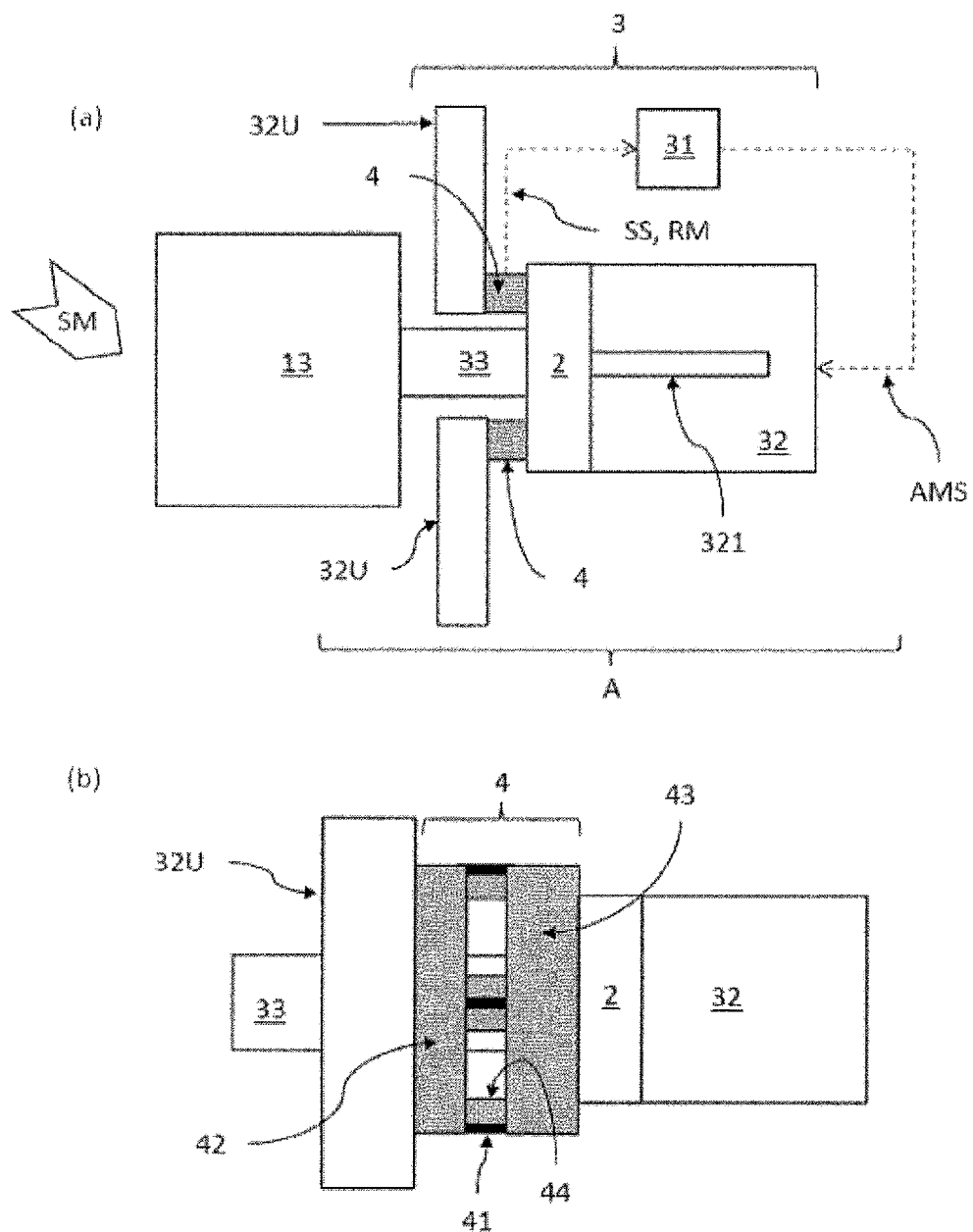

FIG. 2 shows an embodiment of a drive mechanism A according to the invention, with load sensors 4 in the area of the pitch drive 3 (a) as an overview in a side sectional view, and (b) as a detailed view of the load sensor 4 in a side view. Here, the pitch drive 3 has a drive regulation unit 31, a drive motor 32 with a motor shaft 321, a pitch gear 2 and, if applicable, additional connected parts (not shown here) of the drive mechanism A. The drive motor 32 here is connected via the pitch gear 2 and the drive shaft 33 to the rotor blade 13, whereby the motor shaft 321 of the drive motor 32 engages with the pitch gear 2, and the torques of the motor shaft 321 are appropriately transmitted via the pitch gear 2 to the drive shaft 33. In this embodiment, the pitch gear 2 is permanently mounted onto a base 32U that is connected to the hub 12. In other embodiments, the base 32U could also be connected to other components of the pitch drive 3. After a difference between the target position and the actual position of the rotor blade 13 has been determined, an appertaining drive torque is exerted by the motor shaft 321 onto the pitch gear 2 until the rotor blade 13 has reached it target position. Moreover, at least one load sensor 4 is arranged in the area of the pitch drive 3 for purposes of determining the mechanical load being exerted on the drive mechanism A due to the disturbance torque SM (indicated by an arrow) that is acting on the rotor blade 13. The load sensor 4 sends a sensor signal SS to the drive regulation unit 31, corresponding to the mechanical load. In this embodiment, the load sensor 4 comprises one or more strain gauges 41 and it is arranged between the pitch gear 2 and the base 32U in order to measure the response torque RM. Via a force that acts on the rotor blade 13 as a disturbance torque SM, the drive shaft 33, and thus also the pitch gear 2, are moved in a manner that depends on the disturbance torque SM, for example, as a rotational moment or tilting relative to the base 32U. These relative movements are the response to the disturbance torque SM and are measured as a response torque RM by the strain gauges 41 of the load sensor 4. In FIG. 2(b), the load sensor 4 is shown in an enlarged and more detailed form than in part (a). In this embodiment, the load sensor 4 comprises a first flange 42 for attachment to the base 32U and a second flange 43 for attachment to the pitch gear 2. The first flange 42 and the second flange 43 are connected to each other via connecting struts 44 on which strain gauges 41 (depicted as black lines) have been mounted; for example, the strain gauges 41 are glued onto the connecting struts 44 in a suitable position. The flanges 42, 43 as well as the connecting struts 44 are made, for instance, of steel. Commercially available strain gauges can be used as the strain gauges 41. Due to the sensor signal SS, the drive regulation unit 31 influences the drive motor signal AMS in such a way that the drive motor 32 yields correspondingly to the disturbance torque SM. In this manner, the action of the force exerted by the disturbance torque SM on the drive mechanism A is reduced or, in the ideal case, avoided altogether. By the same token, this damps the vibrations thus caused in the drive mechanism A.

Figure 3:
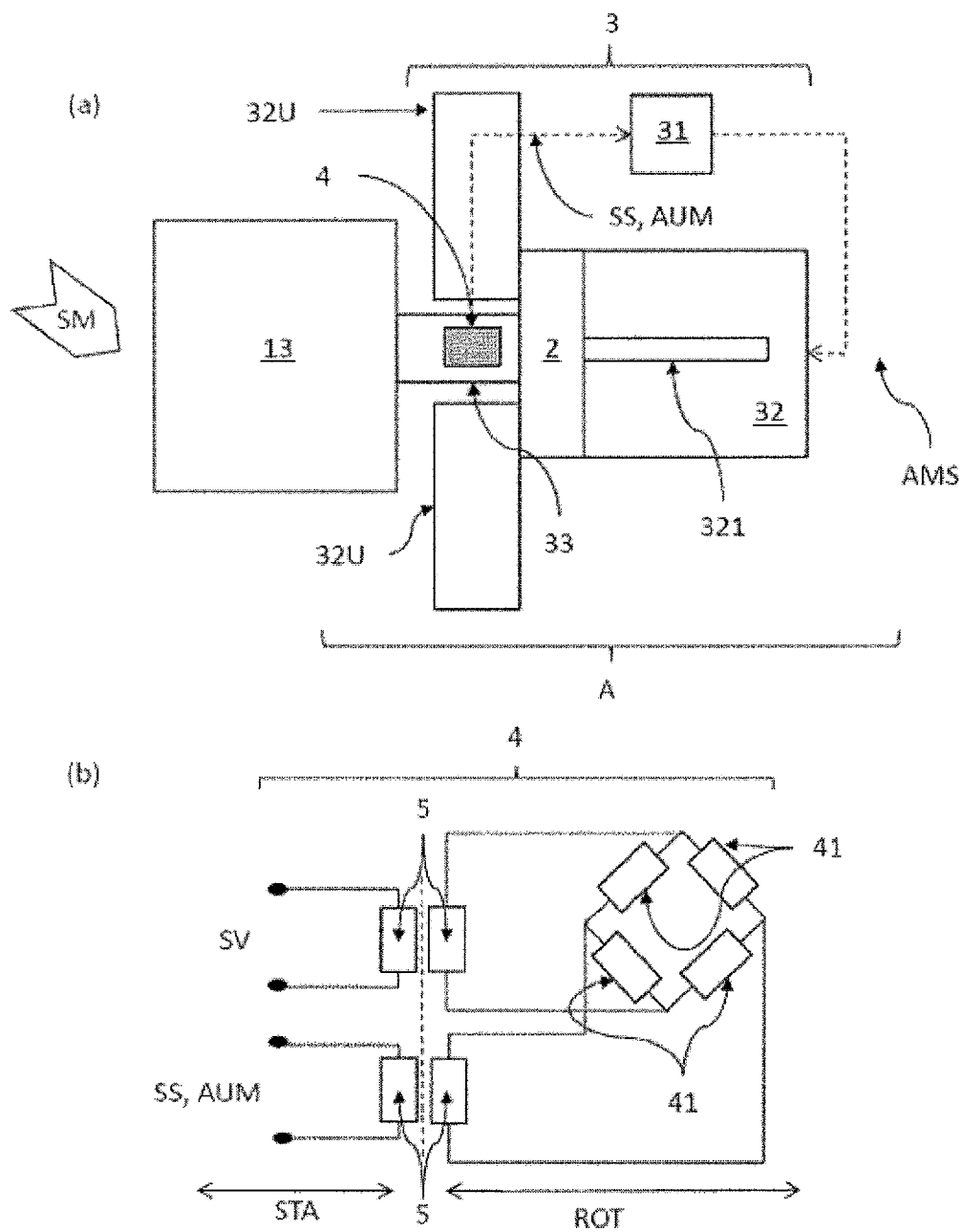
Figure 4:
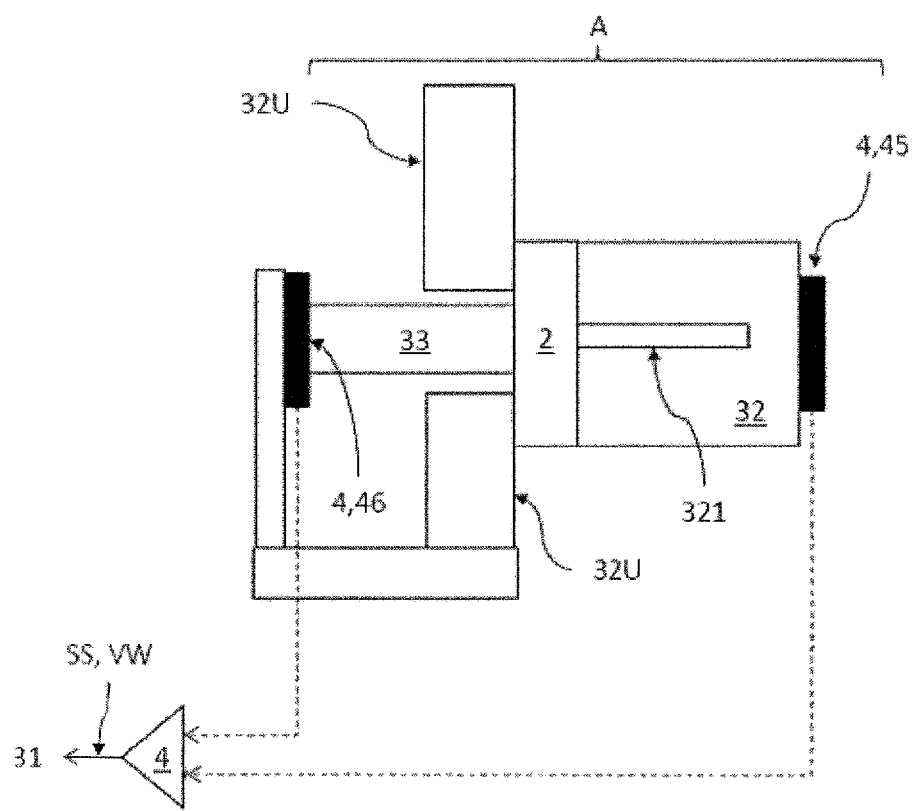

FIG. 3 shows an alternative embodiment of a drive mechanism A according to the invention, with a load sensor 4 on the drive shaft 33 (a) as an overview, and (b) as a detailed view of the load sensor 4. Here, the pitch drive 3 has a drive regulation unit 31, a drive motor 32 with a motor shaft 321, a pitch gear and, if applicable, additional connected parts (not shown here) of the drive mechanism A. The drive motor 32 here is connected via the pitch gear 2 and the drive shaft 33 to the rotor blade 13, whereby the motor shaft 321 of the drive motor 32 engages with the pitch gear 2, and the torques of the motor shaft 321 are appropriately transmitted via the pitch gear 2 to the drive shaft 33. In this embodiment, the pitch gear 2 is likewise (as in FIG. 2) permanently mounted onto a base 32U that is connected to the hub 12. In other embodiments, the base 32U could also be connected to other components of the pitch drive 3. After ascertaining a difference between the target position and the actual position of the rotor blade 13, an appertaining drive torque is exerted on the pitch gear 2 until the rotor blade 13 has reached its target position. Moreover, here, at least one load sensor 4 is arranged on the drive shaft 33 for purposes of determining the mechanical load being exerted on the drive mechanism A due to a disturbance torque SM (indicated by an arrow) that is acting on the rotor blade 13. The load sensor 4 sends a sensor signal SS to the drive regulation unit 31, that corresponds to the mechanical load. In this embodiment, the load sensor 4 comprises several strain gauges 41 to measure the output torque AUM on the drive shaft 33. Via a force that acts on the rotor blade 13 as the disturbance torque SM, the drive shaft 33 is moved in a manner that is dependent on the disturbance torque SM, for example, as a rotational movement or tilting relative to the drive motor 32 and to the target position of the drive shaft 33. These relative movements are measured by the load sensor 4 and are transmitted contact-free—for example, via the base 32U—to the drive regulation unit 31 as the sensor signal SS. An embodiment of a load sensor 4 with a contact-free power supply SV of the strain gauges 41 and the contact-free pick-up of the sensor signal SS via a rotary transformer transmission 5 is shown in FIG. 3(b) in detail. The load sensor here is divided into a static (non-rotating) part STA and a rotating part ROT on whose boundary surface the rotary transformer transmissions 5 are arranged in order to supply power SV to the rotating part ROT and to pick up sensor data in order to emit a sensor signal SS as the output torque AUM. For purposes of measuring the mechanical load of the drive shaft 33, the strain gauges 41 are arranged on the drive shaft 33 as a strain gauge full-bridge and they can thus determine the shear strain on the drive shaft 33, which is a measure of the output torque AUM. As an alternative, the data pick-up and the power supply can also take place by means of a slip ring transmitter. On the basis of the sensor signal SS, the drive regulation unit 31 influences the drive motor signal AMS in such a way that the drive motor 32 appropriately yields to the disturbance torque SM. As a result, the action of the force exerted by the disturbance torque SM on the drive mechanism A is reduced or, in the ideal case, avoided. By the same token, any resultant vibrations in the drive mechanism A are damped. FIG. 4 shows another alternative embodiment of a drive mechanism A according to the invention, with a load sensor 4, comprising two rotary encoders 45, 46. The coupling of the pitch gear 2 to the rotor blade 13, for example, via a pinion that engages with a sprocket wheel, and the attacking disturbance torque SM are not shown in detail here. However, in principle, the same remarks apply here are those made above with reference to FIGS. 2 and 3. Here, the first rotary encoder 45 is arranged on the drive motor 32 while the second rotary encoder 46 is arranged on the drive shaft 33. As an alternative, the second rotary encoder 46 can also be arranged on the rotating part of the rotor blade 13. The mechanical load, which is transmitted as the sensor signal SS to the drive regulation unit 31, is determined from a relative torsional angle VW between the rotary encoders 45, 46. If torques are present (drive torque, disturbance torque, rotational torque of the rotor blade), an elastic torsional stress arises in the mechanical transmission elements of the drive shaft 33 all the way to the rotor blade 13, said stress corresponding to the torsional angle VW. This torsional angle VW is influenced over time by the disturbance torque SM and it deviates from the expected torsional angle without disturbance torques. Thus, the disturbance torque SM can be measured on the basis of the actual torsional angle VW. Due to the sensor signal SS, the drive regulation 31 influences the drive motor signal AMS in such a way that the drive motor 32 appropriately yields to the disturbance torque SM. In this manner, the action of the force exerted by the disturbance torque SM on the drive mechanism A is reduced or, in the ideal case, avoided altogether. By the same token, this damps the vibrations thus caused in the drive mechanism A.

Figure 5:
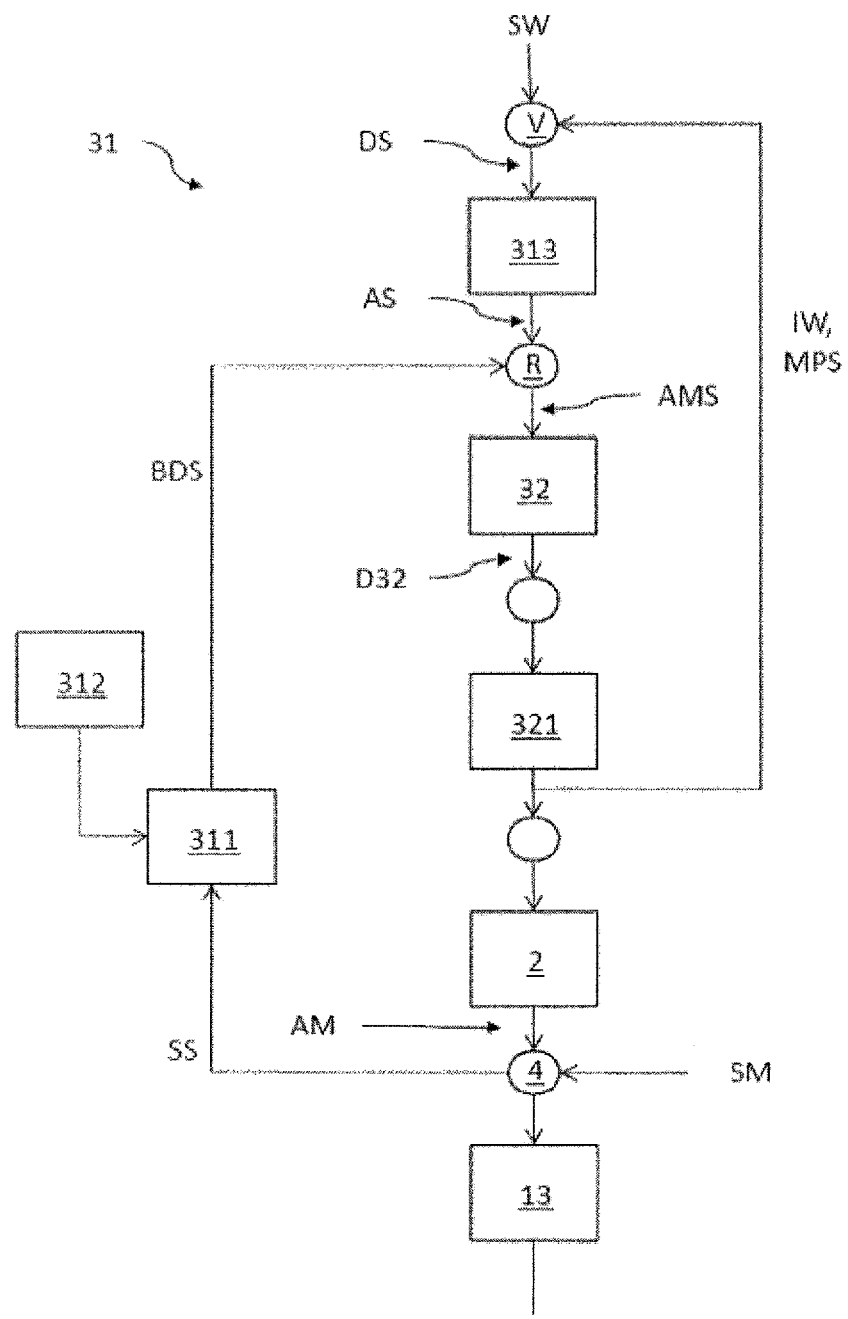

FIG. 5 shows an embodiment of a drive regulation 31 according to the invention, with feedback R of the evaluated torque signal BDS. For example, after a request that electrical power be fed to a power network, a superordinated system provides a signal of a target value SW for the rotor blade position as the input quantity in the drive regulation 31. This target value signal SW is compared V (shown as a circle in the sequence of steps) to the signal of the actual value IW that indicates the actual rotor blade position. In this embodiment, the actual value signal IW for the position of the rotor blade 13 corresponds to the drive motor position signal MPS. The differential signal DS based on the difference between the actual value IW and the target value SW is entered into a position regulator 313, which performs a frequency-dependent amplification of this signal and emits a corresponding output signal AS. This output signal is compared to an evaluated torque signal BDS by the feedback means R and is transferred as a corresponding drive motor signal AMS to the drive motor 32. The evaluated torque signal BDS is based on the load of the drive mechanism A that is measured by a load sensor 4 and that results from a disturbance torque SM attacking the rotor blade 13. The load sensor 4 sends an appropriate sensor signal SS to the feedback means 311, where the sensor signal SS is evaluated as a function of the frequency and the amplitude. In order to take vibration effects into account, the feedback means 311 has a separate damping regulator 312 whose output value likewise enters into the evaluated torque signal BDS. Consequently, in the comparison point R (feedback) of the drive regulation unit 31, the information is available indicating that additional loads occur for the drive mechanism and also indicating their magnitude. Disturbance torques SM are caused, for example, by a fluctuating wind speed on the rotor blade 13. The feedback R of the evaluated torque signal BDS causes an attacking disturbance torque SM on the rotor blade 13 to give rise to an identical torque on the drive motor 32. Thus, the attacking disturbance torques SM stemming from the pitch drive 3 can be compensated for by the desired adjustment speed by means of compensation movements on the motor shaft 321. The drive motor position regulation carried out obo the drive motor position signal MPS, the inertia of the drive mechanism A and the friction give rise to torques that are oriented opposite to the disturbance torque SM. The torques that are caused by friction are not shown explicitly in this depiction. The suitable frequency-dependent evaluation and feedback of the sensor signal SS in the feedback means 311 cause the drive motor 32 to respond to the attacking disturbance torques SM to such an extent that, due to the stresses in the mechanical transmission elements of the drive mechanism A, the rotating masses are excited to vibrate to a lesser extent or not at all, or else they decay in a well-damped manner. In case of an unexpected drop in the load, the drive motor 32 can exert more force in response so as to keep the ultimately acting torque as constant as possible. In contrast, if the load is too high, the drive motor 32 responds by yielding. Since the drive motor 32 yields to the forces, this feedback R lessens the abrupt load peaks in case of a change in the direction of the torques when there is mechanical play in the transmission members and gears. The drive motor 32 generates a torque D32 of the drive motor 32 on the motor shaft 321. The drive torque AM is fed back from the outlet of the pitch gear 2 and it counters the drive motor torque D32. The torques D32 and AM that act on the motor shaft 321 generate a total torque that accelerates the motor shaft 321 of the drive motor 32 and this lead to a change in the torsional angle of the motor shaft 321. The difference between the torsional angle of the motor shaft 321 on the drive motor 32 and the torsional angle of the rotor blade 13 gives rise to a torsional stress in the mechanical transmission elements of the drive mechanism A extending from the motor shaft 321 to the rotor blade 13 that brings about the drive torque AM at the outlet of the pitch gear 2. External torques of the rotor blade 13 (disturbance torques SM) are superimposed onto the drive torque AM at the driven element of the pitch gear 2. The total torque acting on the rotor blade 13 results from the sum of the torques and it accelerates the rotor blade 13, which causes a change in the rotor blade position.

Figure 6:
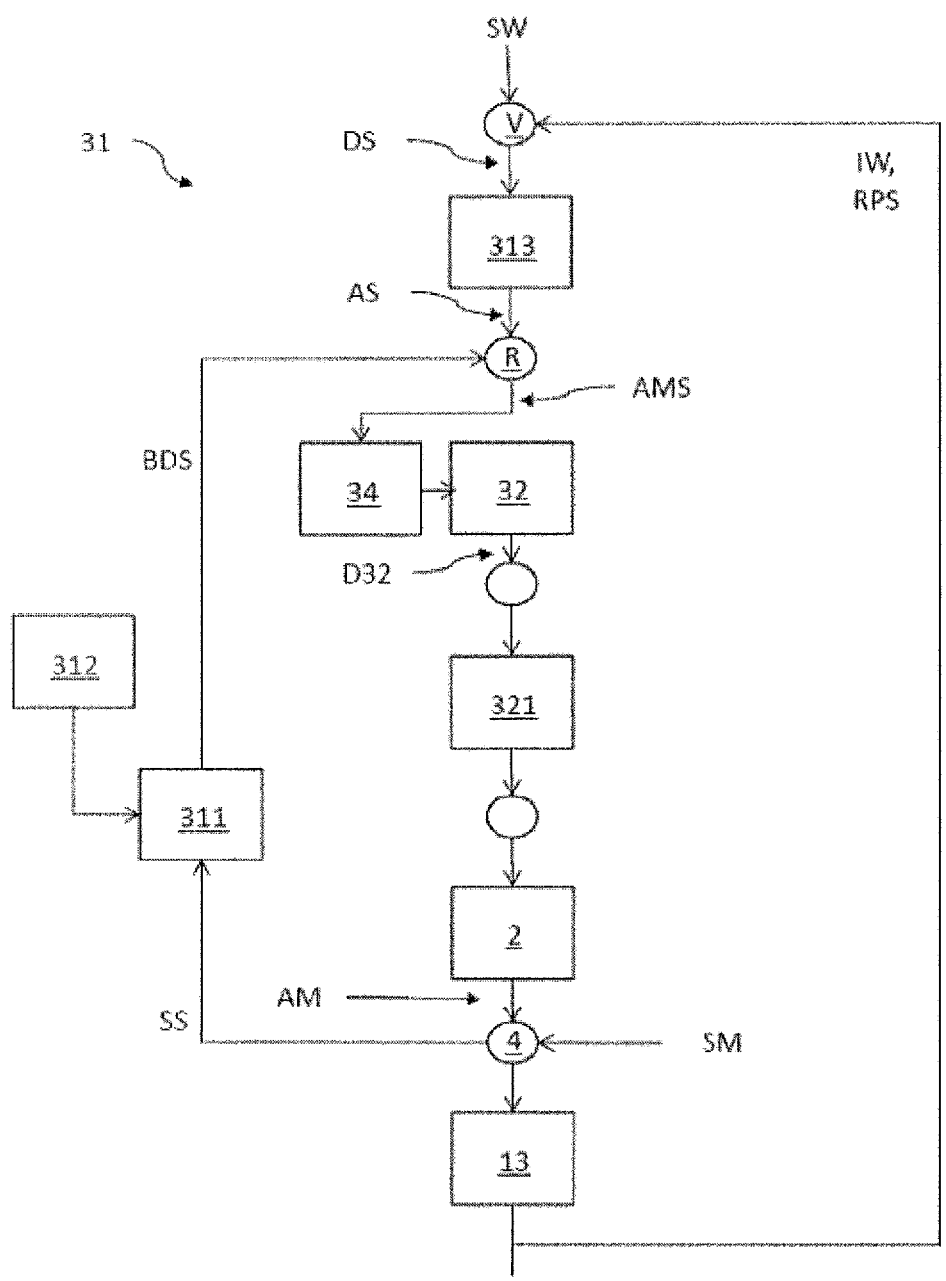

FIG. 6 shows an alternative embodiment of a drive regulation according to the invention, with feedback R of the evaluated torque signal BDS. This concept can preferably be employed if the position of the rotor blade adjustment is not measured directly on the drive motor 32 (as in FIG. 5), but rather on a rotatable part that is associated with the rotation of the rotor blade 13 in a less elastic connection. Here, in contrast to FIG. 5, the actual value IW for the position of the rotor blade 13 is determined on the basis of the rotor blade position signal RPS, whereby the output signal AS of the position regulator 313 is compared R to the evaluated torque signal BDS that has been fed back and transferred to a torque regulator 34 for purposes of regulating the drive motor 32. The torque regulator 34 carries out a frequency-dependent amplification of the comparative value and then supplies this value to another internal current circuit or to another internal motor speed circuit (not shown here explicitly). These circuits are not shown here in detail since they correspond to the state of the art. For the other regulation steps, reference is hereby made to FIG. 5. This regulation is also achieved in that the drive motor 32 yields when the disturbance torque SM increases. Only when the target value SW for the torque has been augmented by a correcting signal from the position regulator 313, which is measured as a result of a yielding rotor blade position RPS, does the drive motor 32 respond to the disturbance torques SM.

A systematic setting of one of the displayed control circuits (FIGS. 5 and 6) achieves that the drive motor 32 and the rotor blade 13 respond largely synchronously with a prescribed frequency and desired damping by yielding to external disturbance torques SM, thus relieving the transmission elements of the drive mechanism A of the rotor blade adjustment means.

The embodiments shown here are only examples of the present invention and should not be construed in a limiting fashion. Alternative embodiments considered by the person skilled in the art are likewise encompassed by the scope of protection of the present invention.

LIST OF REFERENCE NUMERALS 1 wind turbine
11 rotor
12 hub
13 rotor blade
14 tower
15 nacelle
2 pitch gear
3 pitch drive
31 drive regulation
311 feedback means
312 damping regulator
313 position regulator
32 drive motor
32U base for attachment of the pitch drive
321 motor shaft
33 drive shaft
34 torque regulator
4 load sensor
41 strain gauge
42 first flange
43 second flange
44 connecting strut
45 first rotary encoder
45 second rotary encoder
46 rotary transformer transmission
A drive mechanism
AM drive torque
AMS drive motor signal
AS output signal position regulator
AUM output torque
BDS evaluated torque signal
D32 torque drive motor
DMA torque drive motor
DG axis of rotation of the nacelle
DN axis of rotation of the hub
DRB axis of rotation of the rotor blade
DS differential signal
IW actual value, actual value signal
MPS drive motor position signal
R feedback of the evaluated torque signal
RM response torque
ROT rotating part of the load sensor
RPS rotor blade position signal
SM disturbance torque
SS sensor signal
STA static (non-rotating) part of the load sensor
SV power supply of the load sensor
SW target value, target value signal
V comparison of the actual value to the target value
VW torsional angle
W wind

The invention claimed is:

1. A wind turbine comprising:
a rotor comprising a hub and at least one rotor blade rotatable around a longitudinal axis and mounted in said hub;
a drive mechanism comprising a pitch drive connected via a drive shaft to said rotor blade and having a drive regulation unit, a drive motor, and a pitch gear;
said pitch drive configured to set an angle of attack of said rotor blade relative to wind by exerting a drive torque on said pitch gear corresponding to an ascertained difference between a target position and an actual position of said rotor blade;
at least one load sensor arranged in an area of said pitch drive and configured to determine a mechanical load being exerted on said drive mechanism due to a disturbance torque and to emit a sensor signal corresponding to said mechanical load; and
said drive regulation unit comprising a feedback element configured to feedback an evaluated torque signal on the basis of said sensor signal.

2. The wind turbine according to claim 1, wherein said feedback element is configured to influence a drive motor signal for said drive motor on the basis of said evaluated torque signal.

3. The wind turbine according to claim 1, wherein said feedback element derives said evaluated torque signal on the basis of said sensor signal by taking into account said disturbance torque, and adds it directly or indirectly to a torque of said drive motor.

4. The wind turbine according to claim 1, wherein said feedback element evaluates said sensor signal as a function of frequency and amplitude of said sensor signal.

5. The wind turbine according to claim 1, wherein said feedback means comprises a separate damping regulator.

6. The wind turbine according to claim 1, wherein said ascertained difference between said target position and said actual position of said rotor blade is determined on the basis of position of said motor shaft, and a differential signal is fed to a position regulator in said drive regulation unit.

7. The wind turbine according to claim 1, wherein said ascertained difference between said target position and said actual position of said rotor blade is determined on the basis of position of said motor shaft, and a differential signal is fed to a position regulator in said drive regulation unit, an output signal of said position regulator is compared to said evaluated torque signal that has been fed back from said feedback element, and an output signal is then transmitted to a torque regulator that serves to regulate said drive motor.

8. The wind turbine according to claim 1, wherein said drive regulation unit comprises a comparator that compares said sensor signal to current of said drive motor.

9. The wind turbine according to claim 1, and comprising a second regulation unit and wherein said drive regulation unit is connected to said second regulation unit in order to provide said sensor signal to said second regulation unit.

10. The wind turbine according to claim 1, wherein said load sensor comprises one or more strain gauges and is arranged between said drive motor and a base of said pitch drive that is connected to said hub in order to measure a response torque.

11. The wind turbine according to claim 10, wherein said load sensor comprises a first flange attached to said base of said pitch drive and a second flange attached to said pitch drive, and at least one connecting strut between said first and second flanges on which said strain gauges are disposed.

12. The wind turbine according to claim 1, wherein said load sensor comprises one or more strain gauges and is arranged on said drive shaft in order to measure an output torque on said drive shaft.

13. The wind turbine according to claim 12, and comprising a power supply to said strain gauge and wherein pick-up of said sensor signal takes place contact-free via a rotary transformer transmission or via a slip ring transmitter.

14. The wind turbine according to claim 1, wherein said load sensor comprises a first rotary encoder arranged on said drive motor and a second rotary encoder arranged on said drive shaft, in said pitch drive or on a rotating part of said rotor blade, and said mechanical load is determined from a relative torsional angle between said first rotary encoder and said second rotary encoder.

15. The wind turbine according to claim 1, and comprising a motor current sensor configured to determine current of said drive motor and a regulating observation element, wherein said load sensor comprises a first rotary encoder arranged on said drive motor and a second rotary encoder arranged on said drive shaft, in said pitch drive or on a rotating part of said rotor blade, and said regulating observation element is configured to determine said mechanical load on the basis of measured values of said first rotary encoder, said second rotary encoder and said motor current sensor.

16. A method for regulating the drive of a pitch drive in a wind turbine comprising the steps of:

providing a wind turbine as set forth in claim 1 and wherein said pitch drive is connected via said pitch gear to said rotor blade rotatably mounted in said hub;

prescribing a target value for position of said rotor blade;

comparing an actual value for position of said rotor blade to said target value in order to form a differential signal;

emitting a drive motor signal that corresponds to said differential signal so that said drive motor generates a torque on said motor shaft;

rotating said rotor blade by rotating said motor shaft by a certain rotational angle until said target value for position of said rotor blade has been reached;

with said load sensor, determining said mechanical load being exerted on said drive mechanism due to said disturbance torque;

emitting said sensor signal during rotation of said rotor blade; and feeding said evaluated torque signal based on said sensor signal back into said drive regulation unit using said feedback element.

17. The method according to claim 16, and further comprising the step of determining said actual value for position of said rotor blade on the basis of a drive motor position signal or on the basis of a rotor blade position signal.

18. The method according to claim 17, wherein said step of determining said actual value for position of said rotor blade is on the basis of said rotor blade position signal, and comprising the steps of comparing an output signal of a position regulator to said evaluated torque signal that has been fed back, and transferring it to a torque regulator for purposes of regulating said drive motor using a working circuit in the operative state to set said angle of attack of said rotor blade of a wind power plant.

* * * * *